US006545865B2

(12) United States Patent
Albrecht et al.

(10) Patent No.: US 6,545,865 B2
(45) Date of Patent: Apr. 8, 2003

(54) SHOCK MOUNT FOR A DEVICE PACKAGED IN A PORTABLE CARTRIDGE

(75) Inventors: Thomas Robert Albrecht, San Jose, CA (US); Allen Ronald Cox, Eastleigh (GB); David Michael Davis, Tucson, AZ (US); Wayne Isami Imaino, San Jose, CA (US); James Mitchell Karp, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 09/903,711

(22) Filed: Jul. 13, 2001

(65) Prior Publication Data
US 2003/0011980 A1 Jan. 16, 2003

(51) Int. Cl.[7] .................................................. G06F 1/16
(52) U.S. Cl. ...................... 361/685; 248/634; 700/275; 360/137
(58) Field of Search .......................... 361/685, 682–684, 361/686, 724–727; 700/275, 276, 278; 248/560, 562, 631, 611, 615, 634–635; 360/97.01, 137

(56) References Cited
U.S. PATENT DOCUMENTS

| 4,796,136 A | 1/1989 | Henze et al. ............... 360/132 |
| 4,888,659 A | 12/1989 | Marquez ..................... 360/132 |
| 4,896,237 A | 1/1990 | Ohta ........................... 360/132 |
| 4,905,114 A | 2/1990 | Ohta et al. .................. 360/132 |
| 5,055,947 A | 10/1991 | Satoh ........................... 360/62 |
| 5,253,246 A | 10/1993 | Leonhardt et al. .......... 369/291 |
| 5,489,767 A | 2/1996 | Billington ................... 235/437 |
| 6,154,360 A | 11/2000 | Kaczeus, Sr. et al. ...... 361/685 |
| 6,272,011 B1 * | 8/2001 | Chen .......................... 361/685 |
| 6,388,878 B1 * | 5/2002 | Chang ........................ 361/687 |
| 6,424,523 B1 * | 7/2002 | Curtis et al. ................ 361/685 |

FOREIGN PATENT DOCUMENTS

WO     WO 88/09551     12/1988     .......... G11B/17/00

* cited by examiner

Primary Examiner—Darren Schuberg
Assistant Examiner—Hung Van Duong
(74) Attorney, Agent, or Firm—John H. Holcombe

(57) ABSTRACT

A shock mount structure facilitates shock absorption for a device. An outrigger, preferably two wing-like outriggers at diametrically opposite sides of the device, is mounted to the device at an attachment point, and is positioned between two contacting force absorbing members, distributing the shock force to the force absorption members, and supporting the device against slippage with respect to the force absorption members. Leaf spring tabs are formed within the cartridge shell, spaced from an edge of the cartridge shell to allow their flexure. The force absorption members are positioned between the device and the leaf spring tabs, contacting the tabs, such that the tabs assist in absorbing shock force directed at the leaf spring tabs.

26 Claims, 11 Drawing Sheets

SHOCK MOUNT FOR A DEVICE PACKAGED IN A PORTABLE CARTRIDGE

FIELD OF THE INVENTION

This invention relates to shock mounts for devices that may be packaged in portable cartridges, and, more particularly, to portable cartridges that are potentially subject to rough handling, such as cartridges employed for the storage of data. In one embodiment, the device comprises a magnetic disk drive assembly.

BACKGROUND OF THE INVENTION

Portable data storage cartridges typically comprise a data storage media, such as magnetic tape, which are inserted into a separate data storage drive so that data may be read and/or written on the data storage media. Such cartridges are convenient means of storing large quantities of data which are accessed occasionally. They are particularly useful in automated data storage libraries which can contain large numbers of the cartridges on storage shelves and employ a robot accessor to access a cartridge when needed and deliver the cartridge to a data storage drive. Copending and coassigned U.S. patent applications Ser. No. (TUC920000060) and Ser. No. (TUC920010002), describe such data storage cartridges, but which contain devices such as data storage drives, and describe transfer stations for reading and/or writing data, and for supplying power, with respect to the data storage drives.

In handling the cartridges, robot accessors of automated data storage libraries occasionally drop a cartridge, or misplace a cartridge such that it is handled roughly, and manual handling is also likely to result in an occasional dropped or roughly handled cartridge.

Further, a requirement of any data storage device that is to be packaged in a cartridge is that it be small in size (so as to fit within the cartridge); and another requirement is that it have a large data storage capacity (so as to be useful). Data storage devices designed for use in portable computers typically meet these requirements. However, the cartridges are typically subject to rough handling far greater than that of a portable computer.

An example of a data storage device is a magnetic disk drive assembly, which is encased, self-contained and operational, comprising both the necessary mechanical and electronic components. A typical encased magnetic disk drive assembly comprises at least one rotatable disk, a motor for rotating the disk(s), at least one head, an actuator and servo system for seeking and tracking, and addressing, motor control and data handling electronics for reading and writing data, and for communicating at the data transfer interface, for example, employing an industry standard format, such as IDE, SCSI or PCI. The assembly is typically encased to prevent debris from getting into the assembly. The height dimension, comprising the stack of heads, one or more disks, and the disk motor, is typically the most critical, such that there is no room for a support structure for the cover over the disks and heads. Any force exerted on the cover has the possibility of causing the cover to deflect inwardly such that it may contact a head or disk, destroying or causing damage to the disk drive. The case typically has a breathing hole to prevent atmospheric pressure variations from deflecting the cover. An organic filter and a desiccant may be provided on the inside of the hole for filtering debris and contaminants. As the result, although shock absorption is necessary, the cover comprises a sensitive surface which is unable to support a shock absorbing structure. Similarly, the typical magnetic disk drive assembly has a PCB at the bottom surface, which also comprises a sensitive surface that is unable to support a shock absorbing structure without deflecting and damaging the drive. Thus, such sensitive surfaces may be unable to come into contact with a shock absorbing structure without causing damage to the disk drive, and certainly would be unable to come into contact with the cartridge shell, for example, through slippage within the shock mount, without causing damage to the disk drive.

U.S. Pat. No. 6,154,360 describes an impact resistant storage subsystem having a middle pad surrounding the periphery of a data storage device to provide lateral support. Brackets may be added at the outside of the device to expand the size of a small form factor drive to fit the cavity in the middle pad. Upper and lower pads have cavities to provide vertilation to the drive and provide vertical support to the drive at its periphery or at the brackets. When subjected to shock impact in a lateral direction, the middle pad will compress and may allow the drive to slip such that the opposite edge of the drive enters the ventilation cavity of the upper or lower pad, trapping the drive so that it cannot return to the original position. In a subsequent impact, the drive is likely to slap against a housing supporting the pads.

SUMMARY OF THE INVENTION

An object of the present invention is to facilitate shock absorption with respect to a device having at least one attachment point, while avoiding contact with a sensitive surface.

Another object of the present invention is to prevent slippage of the drive in the shock mount, so that the drive may be protected against subsequent shocks.

In one embodiment, a shock mount structure is disclosed for facilitating shock absorption with respect to a device having at least one attachment point, the shock mount structure comprising wing-like outriggers mounted to the device at the attachment point, the outriggers positioned between two contacting force absorption members, distributing shock force of at least one direction to the force absorption members, and supporting the device against slippage with respect to the force absorption members in that direction. The direction is preferably selected to be normal to that of any sensitive surface and thereby allow the force absorption members to avoid contact with the sensitive surface.

As an example, first and second wing-like outriggers are mounted to the device at the attachment point(s), such that the second outrigger is located at a diametrically opposite side of the device from the first outrigger. Thus, the first and second outriggers distribute a shock force normal-to the sensitive surface, generally balanced at either side of the device, to the force absorption members, and support both sides of the device against slippage with respect to the force absorption members in that direction.

In another embodiment, a force absorption member comprises an inner element and an outer element, each of foam materials, the inner element of greater density than the outer element, the inner element in contact with the outrigger(s).

In a further embodiment, leaf spring tabs are formed within the cartridge shell, spaced from an edge of the cartridge shell to allow flexure of the leaf spring tabs. The force absorption member is positioned between the device and the leaf spring tabs, and in contact with the leaf spring tabs, such that the leaf spring tabs assist in absorbing shock force of a direction normal to the leaf spring tabs.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
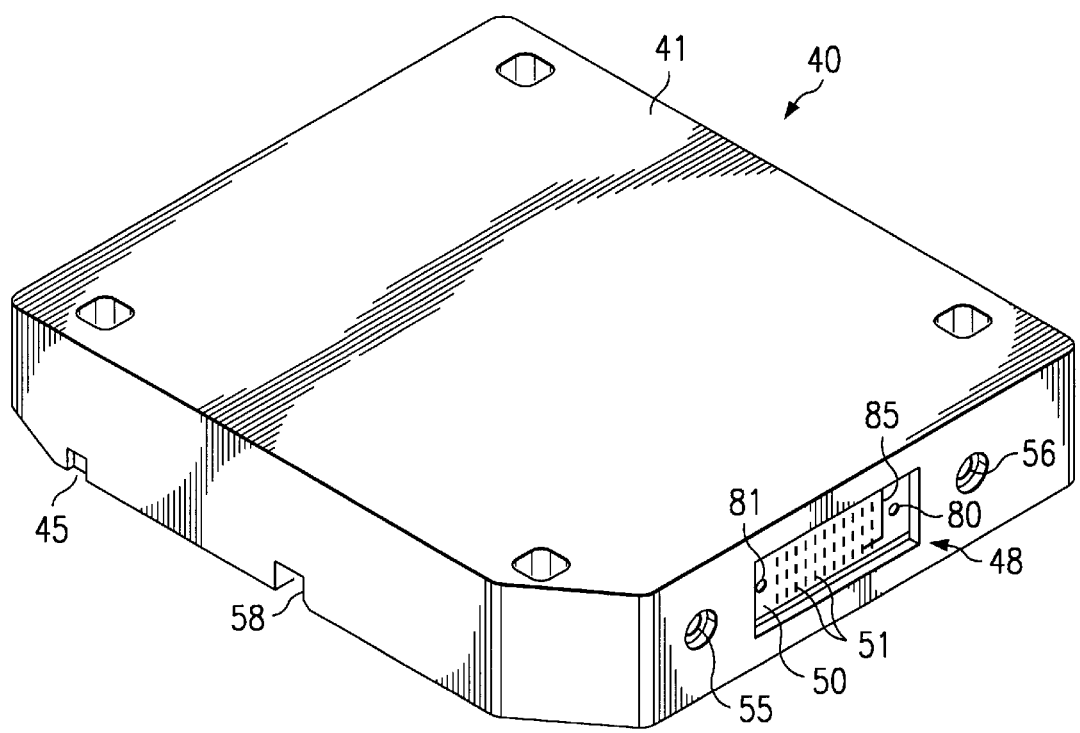
FIG. 1 is an isometric view of a portable cartridge containing a shock mount structure for supporting a device in accordance with the present invention.
Figure 2:
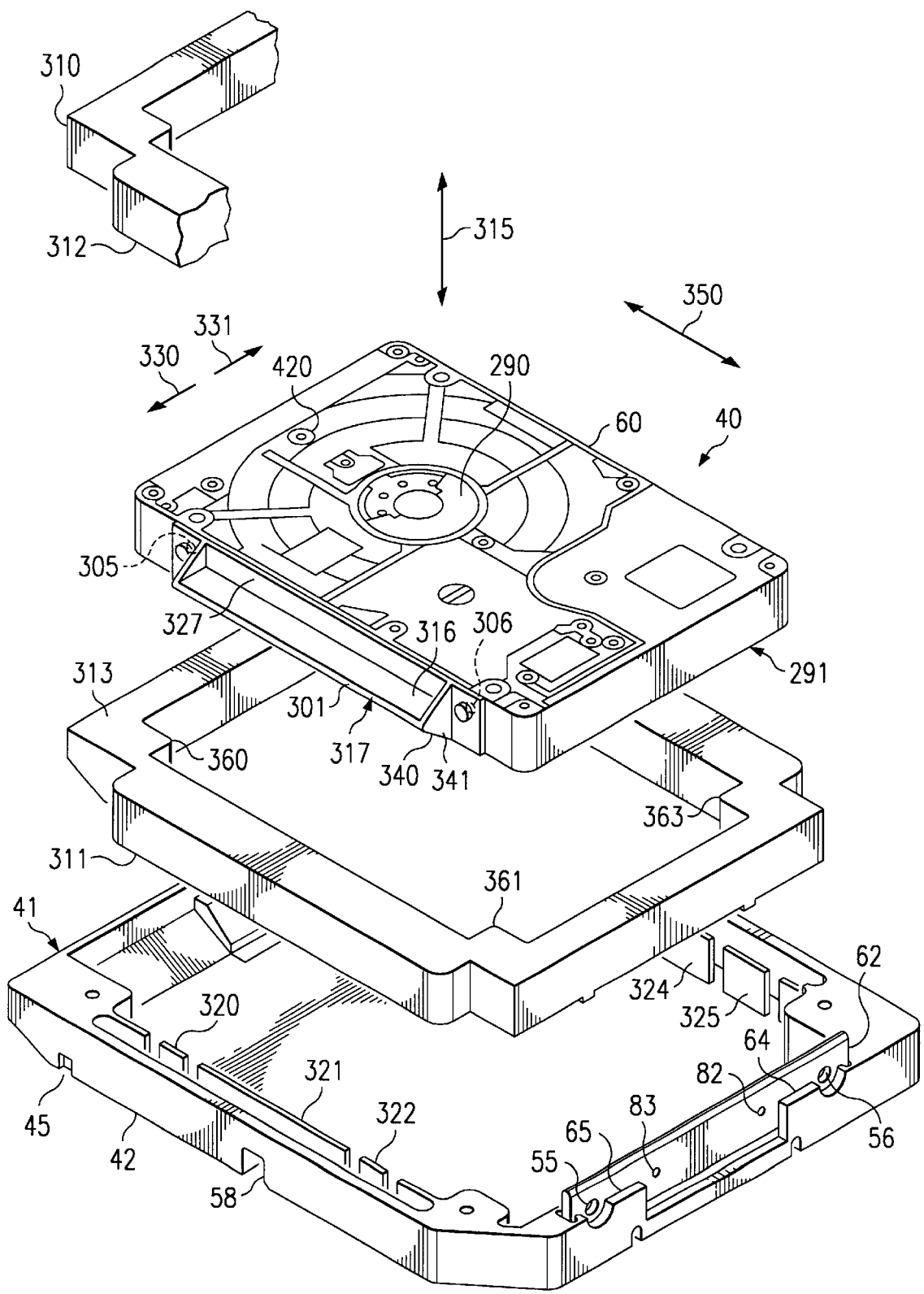
FIG. 2 is an exploded view of an example of a portable data storage cartridge of FIG. 1 containing shock mount structure supporting an encased magnetic data storage drive.
Figure 3:
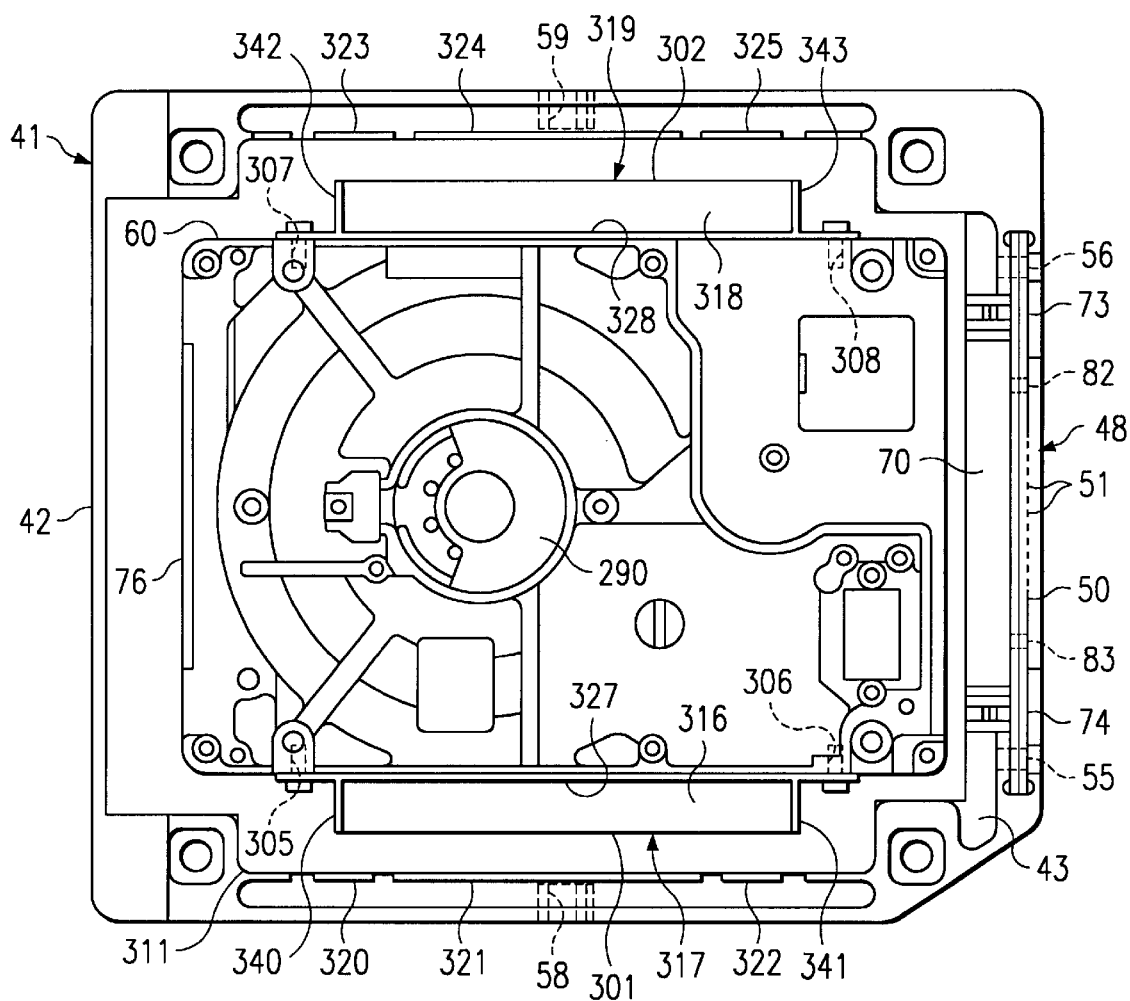
FIG. 3 is a plan view of the portable data storage cartridge of FIG. 2.

Referring to FIGS. 1–3, a portable cartridge 40 is provided having a cartridge shell 41 for storing a device, such as a data storage device. Such portable cartridges have been employed for the storage of data on a length of magnetic tape, but, as discussed in copending U.S. patent application Ser. No. (TUC920010002), a data storage device, or data handling agent, such as an encased, self-contained magnetic disk drive assembly 60 may be mounted in such a cartridge. As discussed above, such portable cartridges may be stored in automated data storage libraries or handled manually. In handling the cartridges, robot accessors of automated data storage libraries occasionally drop a cartridge, or misplace a cartridge such that it is handled roughly, and manual handling is also likely to result in an occasional dropped or roughly handled cartridge. However, the typical data storage drive is not designed to accommodate that level of rough handling. As an example, a magnetic disk drive assembly that is available for use with a portable computer, is typically encased to prevent debris from getting into the assembly, and is preferably self-contained and operational, comprising both the necessary mechanical and electronic components. In this context, the assembly comprises at least one rotatable disk, a motor for rotating the disk(s), at least one head, an actuator and servo system for seeking and tracking, and addressing, motor control, and data handling electronics for reading and writing data, and for communicating at the data transfer interface, for example, employing an industry standard format, such as IDE, SCSI or PCI.

The height dimension, comprising the stack of heads, one or more disks, and the disk motor, is typically the most critical, such that there is no room for a support structure for the cover over the disks and heads. Any force exerted on the cover has the possibility of causing the cover to deflect inwardly such that it may contact a head or disk, destroying or causing damage to the disk drive. A breathing hole is typically provided to prevent variations in atmospheric pressure from deflecting to cover. An organic filter and a desiccant may be provided on the inside of the hole for filtering debris and contaminates. As the result, although shock absorption is necessary, the cover comprises a sensitive surface which is unable to support a shock absorbing structure. Similarly, the typical magnetic disk drive assembly has a PCB at the bottom surface, which also comprises a sensitive surface that is unable to support a shock absorbing structure without deflecting and damaging the drive. Further, such sensitive surfaces may be unable to come into contact with a shock absorbing structure without causing damage to the disk drive, and certainly would be unable to come into contact with the cartridge shell, for example, through slippage within the shock mount, without causing damage to the disk drive.

FIG. 2 comprises an exploded view of an example of the portable cartridge 40 of FIG. 1, and a plan view is illustrated in FIG. 3, and contains, as an example, an encased, self-contained and operational magnetic data storage drive 60. An example of an encased, self contained, magnetic data storage drive of the desired form factor to fit within the cartridge shell 41 comprises the IBM Travelstar 2.5 inch series of magnetic data storage drives. FIGS. 2 and 3 illustrate the bottom half 42 of the cartridge shell 41.

A shock mount structure in accordance with the present invention facilitates shock absorption with respect to the device 60, which may have sensitive surfaces 290 and 291, for example, comprising the entire top surface of the disk drive assembly except for the corners, and comprising much of the bottom surface of the disk drive assembly, and excepting the corners. In one embodiment, first and second wing-like outriggers 301 and 302 are mounted to the device 60 at attachment points 305 and 306, and 307 and 308, respectively, such that the second outrigger 302 is located at a diametrically opposite side of the device 60 from the first outrigger 301. The attachment points 305–307 are those which are typically used to mount the device in a fixed installation, and, therefore, are at the strongest points of the device. The first and second outriggers 301, 302 distribute shock forces normal to the sensitive surface, generally balanced at either side of the device, to force absorption members 310, 311 and support both sides of the device against slippage with respect to force absorption members 310, 311 in those directions. The bottom force absorption member 311 is illustrated in FIG. 3. Specifically, when assembled, force absorption members 310 and 311 are in contact with one another, with surface 312 of force absorption member 310 in contact with surface 313 of force absorption member 311. Wing-like outriggers 301 and 302 are positioned between surface 312 of force absorption member 310 and surface 313 of force absorption member 311. Further, the force absorption members 310 and 311 are each open and do not contact the device 60 at the respective sensitive surface 290 and 291. In the illustrated embodiment, the normal shock forces are defined as perpendicular to surfaces 290 and 291, e.g., as illustrated by arrows 315.

In one embodiment, each of the wing-like outriggers 301 and 302 is in the form of a thin, flat plate, having two surfaces 316, 317 and 318, 319, respectively on opposite sides thereof. Each surface has an average surface plane direction normal to the direction of arrows 315, for distributing the shock force of both the "up" direction of arrows 315 and a shock force of a reverse of the "up" direction to the force absorption members 310, 311 and supporting the device 60 against slippage with respect to the force absorption members 310, 311 in the "up" and the reverse directions. Preferably, the outrigger surfaces 316–319 are flat.

Specifically, as the cartridge 40 is assembled, the device is forced into the force absorption members 310, 311 and the surfaces 316–319 of the wing-like outriggers 301, 302 engage the force absorption members, contacting the surface 313 of the lower member 311 and contacted by the surface 312 of the upper force absorption member 310, with surfaces 313 and 312 in facing contact with one another away from the outriggers. Thus, the outriggers 301 and 302 contact the force absorption members 310, 311 and are in position to distribute any shock force in the directions of arrows 315.

As will be discussed, the force absorption members 310, 311 may comprise multiple elements, each of foam materials, one element of lesser density than other element.

Figure 4:
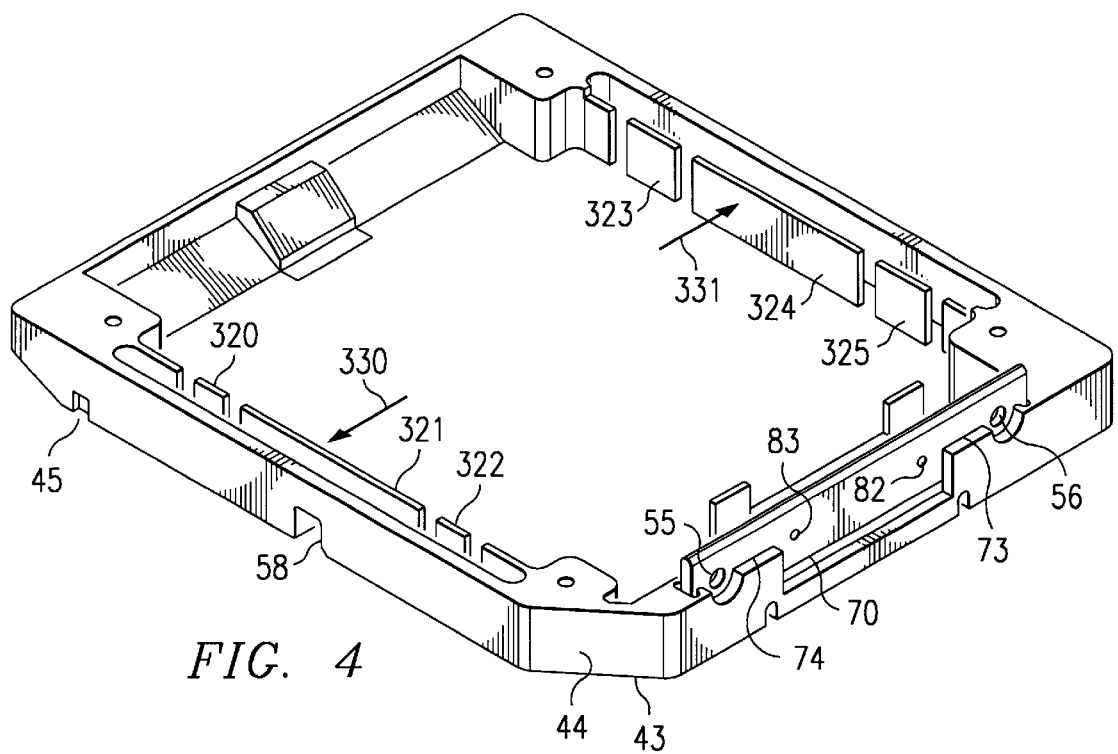
FIG. 4 is an isometric view of the bottom half of the cartridge shell of FIG. 2, illustrating leaf spring tabs within the cartridge shell.

In a further embodiment of the invention, referring additionally to FIG. 4, leaf spring tabs 320–325 are formed within the cartridge shell 41, spaced from an edge of the cartridge shell to allow flexure of the leaf spring tabs. Leaf spring tabs 320–325 are depicted in the bottom half 42 of cartridge shell 41, and corresponding leaf spring tabs are provided in the top half of the cartridge shell 41.

Surface 327 and 328, here shown as the back plane of the wing-like outriggers 301 and 302, respectively, may contact the interior edges of the force absorption members 310, 311 and they, or alternatively the edges of device 60, distribute any shock force in the direction of arrows 330 and 331. The force absorption members 310; 311 are positioned between the device 60 and the leaf spring tabs, and in contact with the leaf spring tabs, such that the leaf spring tabs assist in absorbing shock force of a direction normal to the leaf spring tabs, e.g., as illustrated by arrows 330 and 331. The leaf spring tabs 320–325 may be formed by the molding process of the cartridge shell 41, or, alternatively, may be formed separately and attached to the cartridge shell, e.g., by bonding or cementing.

Thus, the outriggers 301 and 302 contact the force absorption members 310, 311 and are in position to distribute any shock force in the directions of arrows 315, and the force absorption member 311 contacts the leaf spring tabs 320–325, and force absorption member 310 contacts corresponding leaf spring tabs, so as to distribute any shock force in the directions of arrows 330, 331.

In a further embodiment, the first and second outriggers 301, 302 each additionally comprises orthogonal projections 340, 341 and 342, 343, here shown as triangular ears at each end of the outriggers, which are generally orthogonal to each respective outrigger surface 316, 317 and 318, 319, and surfaces 327 and 328. The surfaces of orthogonal projections 340–343 distribute a shock force to the force absorption member orthogonal to both the directions of arrows 315 and to the directions of arrows 330, 331, which directions are illustrated as arrows 350, parallel to the outrigger surfaces 316–319. Specifically, as the cartridge 40 is assembled, the triangular ears 340–343 are forced into the force absorption members 310, 311. Thus, the projections 340–343 become embedded in the force absorption members 310, 311 and are in position such that the surfaces distribute any shock force in the directions of arrows 350, and support the device 60 against slippage with respect to the force absorption members in the directions. Additionally, by being embedded in the force absorption members 310, 311, the orthogonal projections 340–343 exert forces on the force absorption members 310, 311 in the directions of arrows 330 and 331, and in the directions of arrows 315. The orthogonal projections thereby additionally distribute shock force in the directions of 330, 331 and 315, and support the device against slippage with respect to the force absorption members in those directions. The orthogonal projections 340–343 may in effect prevent the interior edges of the force absorption members 310, 311 from contacting surfaces 327 and 328 of the outriggers 301 and 302 while exerting forces in the directions of arrows 330, 331 and arrows 315. Thus, the device 60 is protected against shock in all 6 orthogonal directions.

Other aspects of the portable cartridge 40 are detailed in the copending U.S. patent application Ser. No. (TUC920010002), discussed above. For example, a notch 45, similar to the notch of a tape cartridge, is provided to interlock with a holder in a storage shelf of an automated data storage library which tends to hold the data storage cartridge in position in the shelf. An external data transfer interface electrical connector 48 is provided, incorporating a substrate 50, having electrical contacts 51 on a facing surface of the substrate. The electrical contacts 51 are arranged to match electrical contacts of a transfer station, when in a face-to-face relationship. Alignment, or registration, holes 55 and 56 are provided and mate with corresponding alignment pins of the transfer station to laterally align and register the data transfer interface of the portable cartridge 40 with a data transfer interface of the transfer station. Notches 58 and 59 are provided in the sides of the cartridge shell 41 to allow a loader of the transfer station to engage the portable data storage cartridge 40 and to force the electrical contacts 51 of the data transfer interface electrical connector 48 into non-wiping contact with matching electrical contacts of the transfer station.

Figure 5:
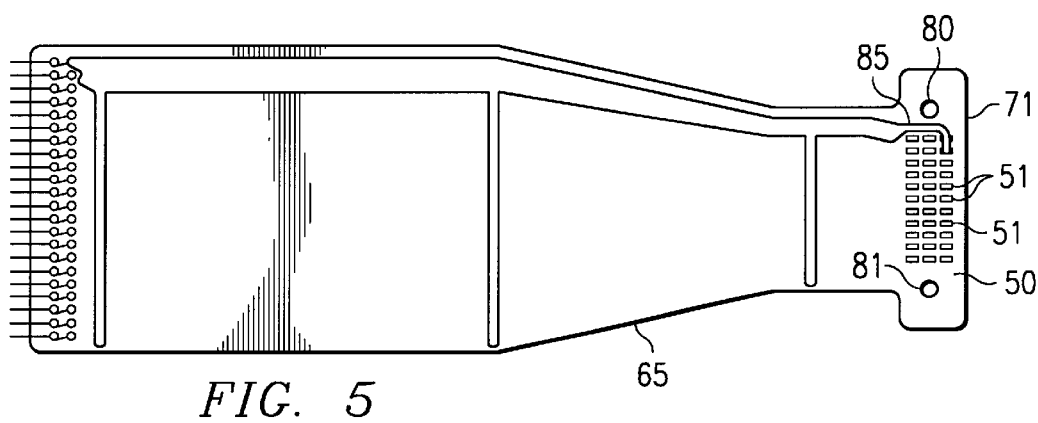
FIG. 5 is a plan view illustration of a flex cable of the portable data storage cartridge of FIG. 2.

Referring additionally to FIG. 5, in conjunction with the outriggers 301, 302, the force absorption members 310, 311, and the leaf spring tabs 320–325, a flex cable 65 interconnects the device 60 and the external data transfer interface 48, while also isolating mechanical contact between the device and the cartridge shell 41. The flex cable 65 is routed through the force absorption member 310 where the force absorption member is open and out of contact with the sensitive surface 290. As the result, the device 60 is protected from rough handling and is able to withstand the dropping of the cartridge, or misplacement the cartridge such that it is handled roughly, either through actions of a robot accessor or through manual handling.

Figure 6:
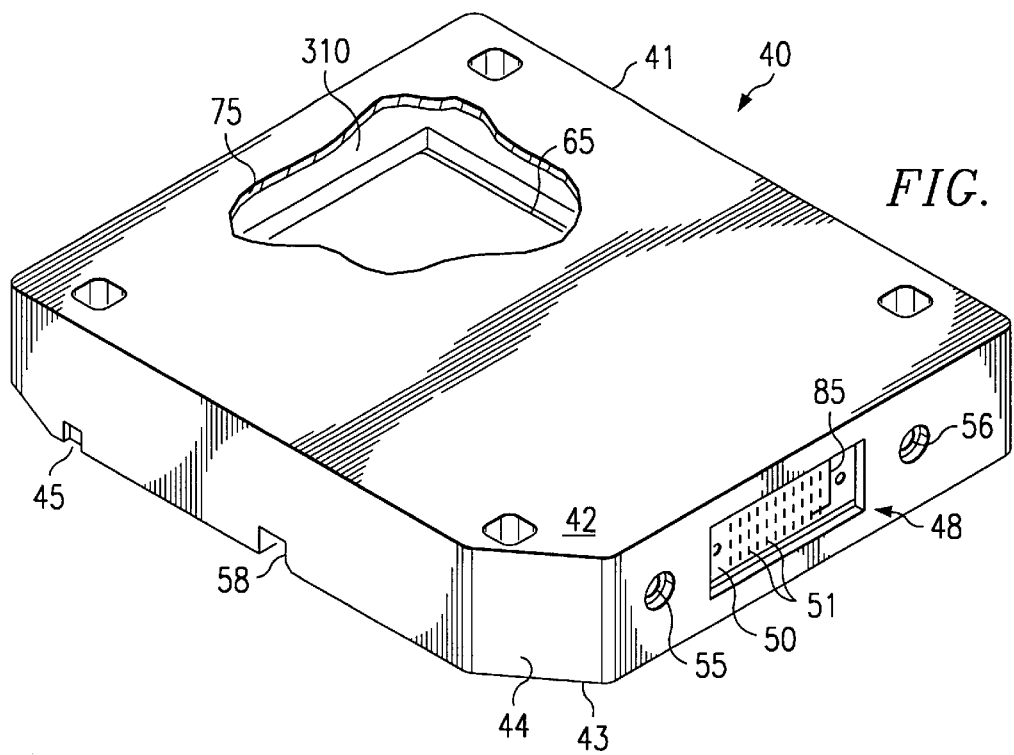
FIG. 6 is a partially cut away isometric view of the portable data storage cartridge of FIG. 2 illustrating the flex cable of FIG. 5.

Referring additionally to FIGS. 4 and 6, a substantially flat backing plate 70 is provided, as discussed in the copending U.S. patent application Ser. No. (TUC920010002), which supports and mounts a termination 71 of the flex cable 65 of FIG. 5, forming the electrical connector 48. The backing plate 70 and flex cable termination 71 snap into slots 73 and 74 in the cartridge shell 41 for mechanical support. The backing plate 70 thus supports and positions the facing surface 50 of the flex cable 65 to form the external data transfer interface electrical connector. FIG. 6 also illustrates force absorption member 310 and the top half 75 of the cartridge shell 41.

The flex cable 65 comprises a plurality of lands coupled to the electrical contacts 51 of the facing surface 50 at the termination 71, and are coupled to the device 60, for example, at a connector 76 at the rear to provide the above described mechanical isolation.

The backing plate 70 may be in the general form of an "H" beam, with a front portion 77 supporting and positioning the flex cable termination 71, and a rear portion 78 which provides structural strength. In the example of the copending U.S. patent application Ser. No. (TUC920010002), the data storage cartridge 40, when loaded into the transfer station, is subjected to considerable force in a direction normal to the facing surface 50. The alignment, or registration, holes 55 and 56 are provided in the substantially flat backing plate 70 in close proximity to the substantially flat substrate 50. The substrate 50 of the flex cable termination 71 is aligned with respect to the backing plate 70 at the time of assembly by use of a probe inserted through holes 80 and 81 of the termination 71 and into holes 82 and 83, respectively, of the backing plate 70. Thus, the substantially flat substrate facing surface 50 is aligned with respect to the backing plate 70 and the alignment or registration holes 55 and 56 therein. The alignment holes are arranged for mating with corresponding transfer station alignment pins to register the external data transfer interface electrical connector 48 with respect to the transfer station.

The flex cable 65, in addition to coupling with the device 60 to provide data transfer with the contacted transfer station, is coupled to a power element of the device to provide power from the transfer station to the device.

Figure 7:
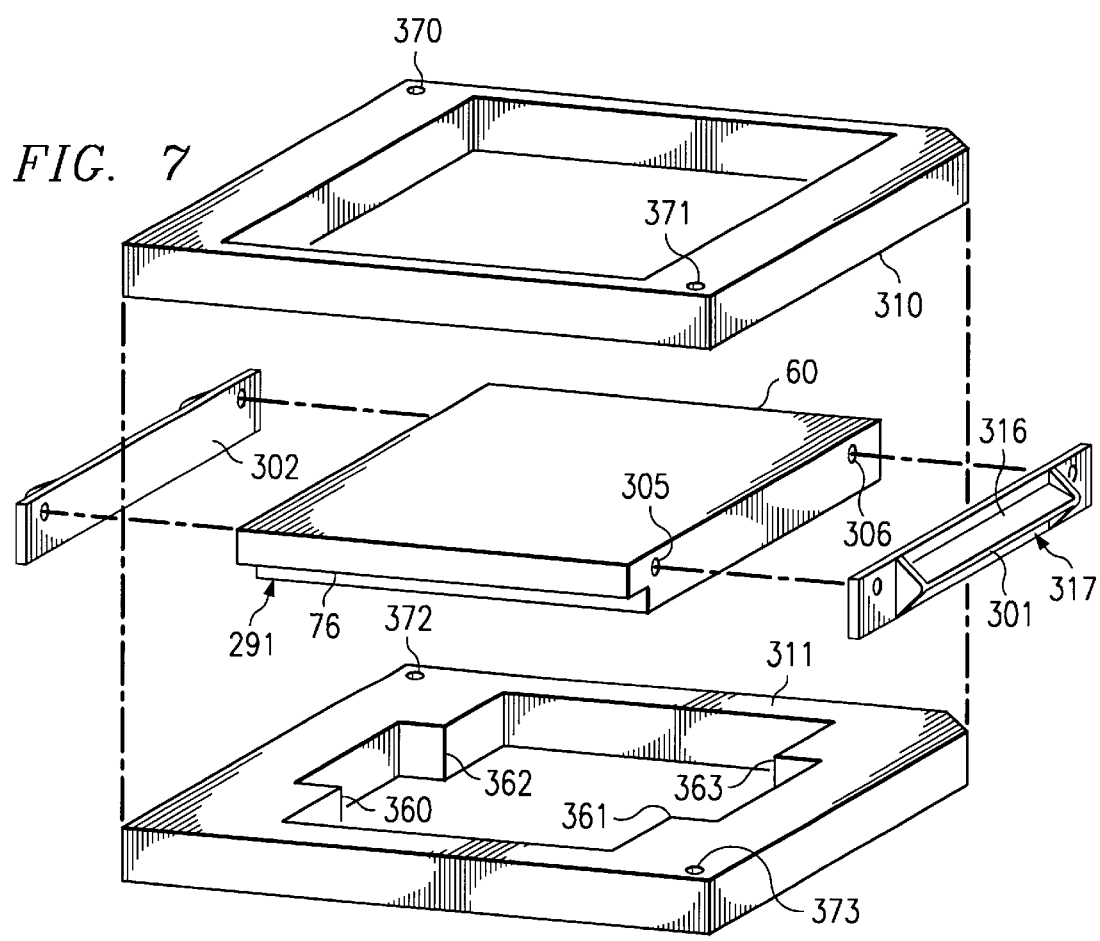
FIG. 7 is an exploded diagrammatic view of a device, two outriggers, and two force absorption members.

Referring to FIGS. 2 and 7, one or more of the force absorption members 310, 311 may be provided with support areas 360–363, as an example, illustrated in member 311. The support areas provide additional support to the device 60 at corners of the device which are not sensitive portions of the sensitive surface 291 of the device 60. Thus, upon assembly of the cartridge, the device is pushed into the support areas until the outriggers 301, 302 contact the force absorption member 311, such that the support areas aid in supporting the device and in absorbing shock forces. Specifically, the support areas 360–363 exert forces on the device 60 which tend to center the device, and thereby support the device against slippage with respect to the force absorption members 310, 311. Alignment holes 370–373 may be employed during assembly to insure that force absorption members 310 and 311 are aligned.

In another embodiment, referring to FIGS. 8–12, one or both of the force absorption members comprises an inner element and an outer element, each of foam materials, the inner element of greater density than the outer element, the inner element in contact with the outrigger. Thus, the inner element provides direct support and shock absorption for the device, and the outer element that is in contact only with an inner element provides shock absorption for the inner element. A less dense outer element is employed because of the much greater contact area between the inner element and the contacting outer element.

Figure 8:
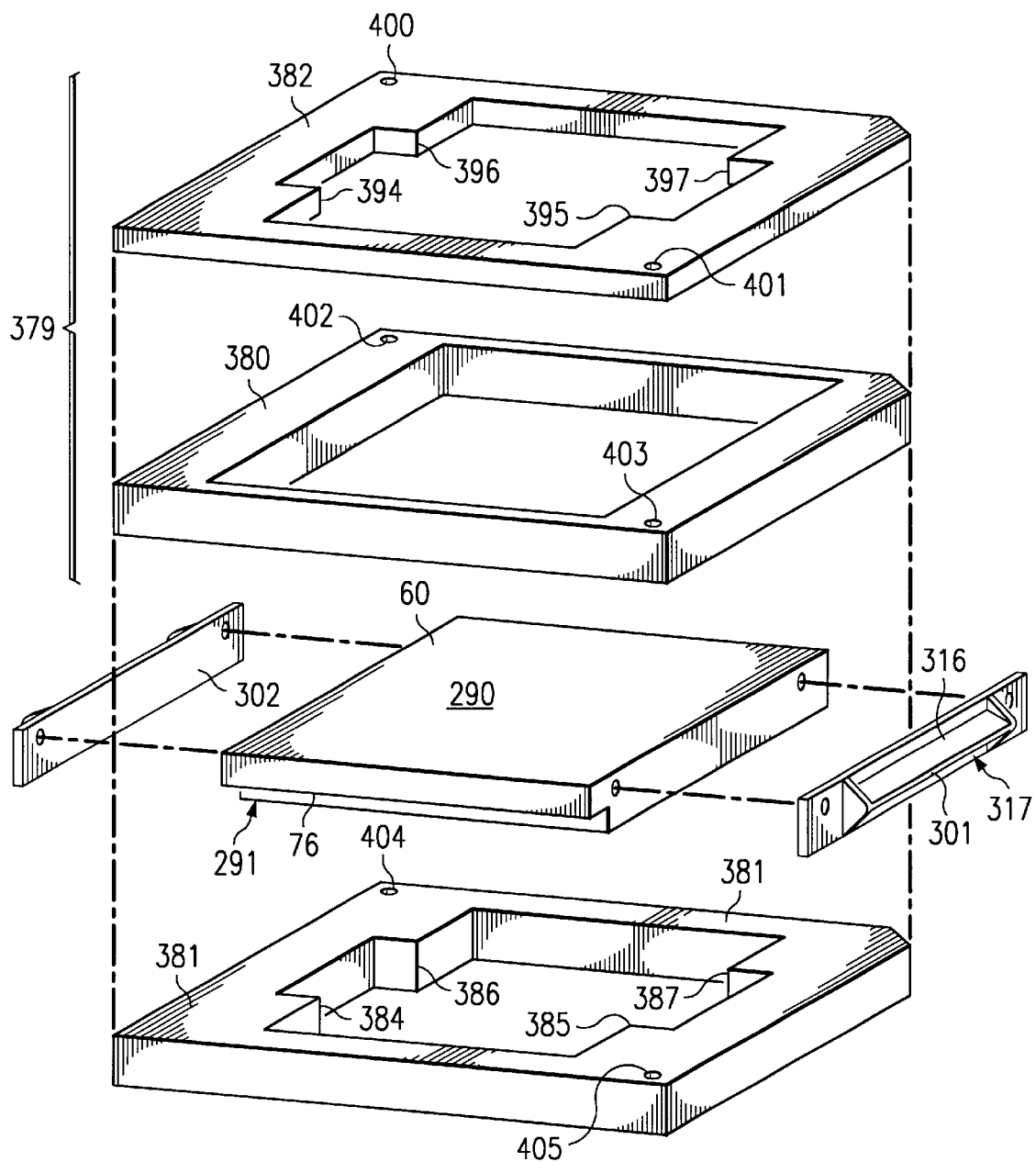
FIG. 8 is an exploded diagrammatic view of a device, two outriggers, and two force absorption members one having an inner element and an outer element.
Figure 9:
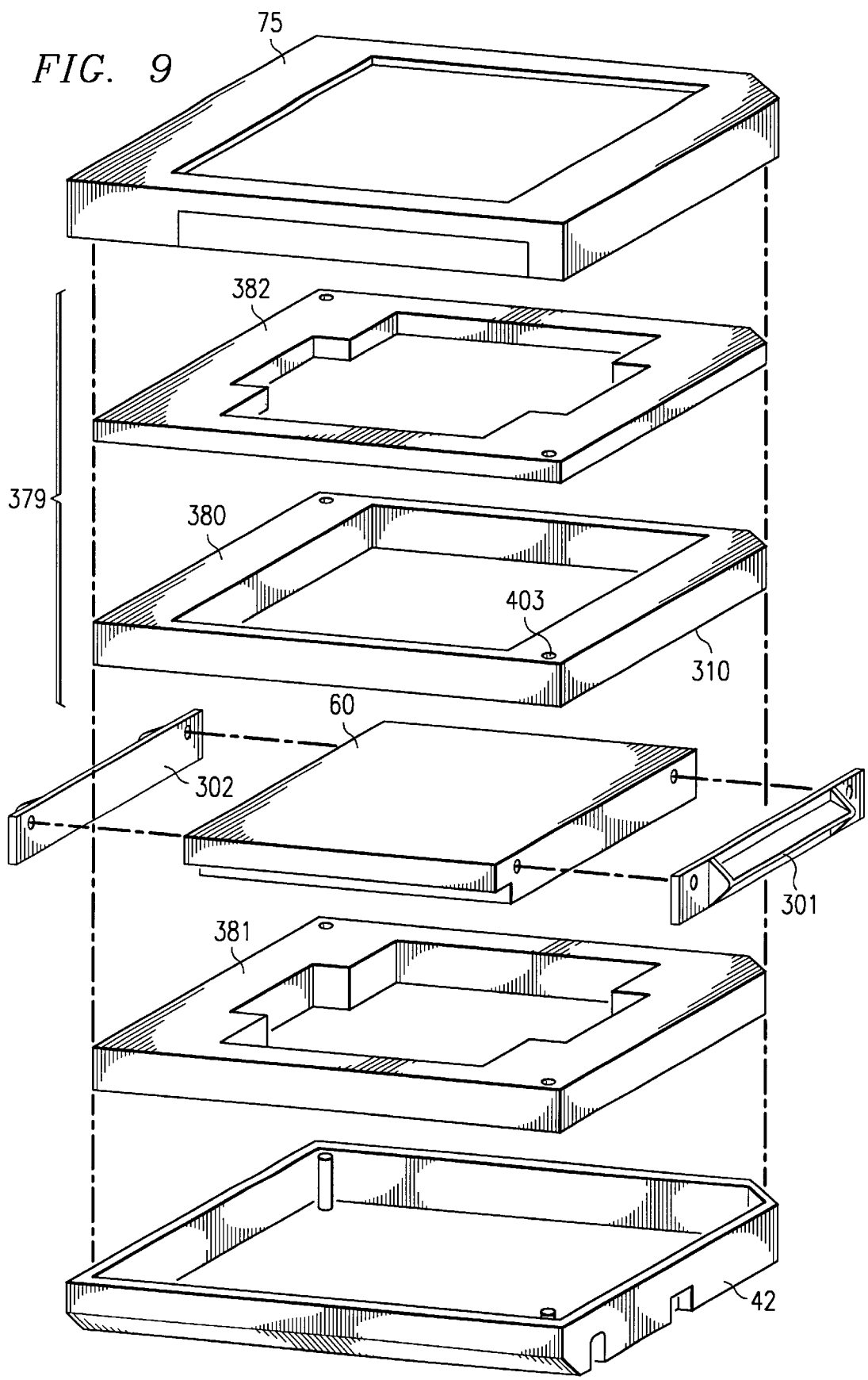
FIG. 9 is an exploded diagrammatic view of the device and structure of FIG. 8, together with the top and bottom halves of the cartridge shell;.

In FIGS. 8 and 9, the force absorption member 379 comprises an inner element 380 and an outer element 382. The outer element 382 is of a lesser density than the inner element 380, and the inner element 380 and force absorption member 381 are in contact with the outriggers 301 and 302 to directly support the device 60 against shock. The densities of the force absorption member elements are determined based upon the mass of the device and the contact area of the outriggers, as is understood by those of skill in the art. As examples, the densities can be measured in terms of lbs./cu. ft., the lesser density foam measured at between 1 and 3 lbs./cu. ft., and the greater density foam measured at between 3 and 5 lbs./cu. ft. EAR Specialties has named a less dense material "CF 45M", and a more dense material "CF 47M". The device, outriggers and force absorption members are assembled with the top 75 and bottom 42 halves of the cartridge shell to form a completed cartridge which facilitates shock absorption with respect to the device 60.

Force absorption member 381 optionally comprises support areas 384–387 to provide additional support to the device 60 at corners of the device which are not sensitive portions of the sensitive surface 291 of the device. Thus, upon assembly of the cartridge, the device is pushed into the support areas until the outriggers 301, 302 contact the force absorption member 381, such that the support areas aid in supporting the device and in absorbing shock forces. Inner element 380 of force absorption member 379 has no support areas, and fits tightly to the sides of device 60 without contacting the sensitive surface 290, such that outriggers 301 and 302 fully transmit shock forces in the upward direction to element 380 of the force absorption member.

In the illustrated example, outer element 382 of force absorption member 379 optionally comprises support areas 394–397 which are spaced from the sensitive surface 290, and which would only support the less sensitive areas of the sensitive surface if the shock force is sufficient to considerably compress force absorption member element 380. Thus, the support areas 394–397 serve as safety supports to prevent the sensitive surface 290 of the device 60 from impacting the top half 75 of the cartridge shell. Alignment holes 400–405 may be provided to align elements 380 and 382 of the force absorption member 379 and force absorption member 381 during assembly of the cartridge.

Figure 10:
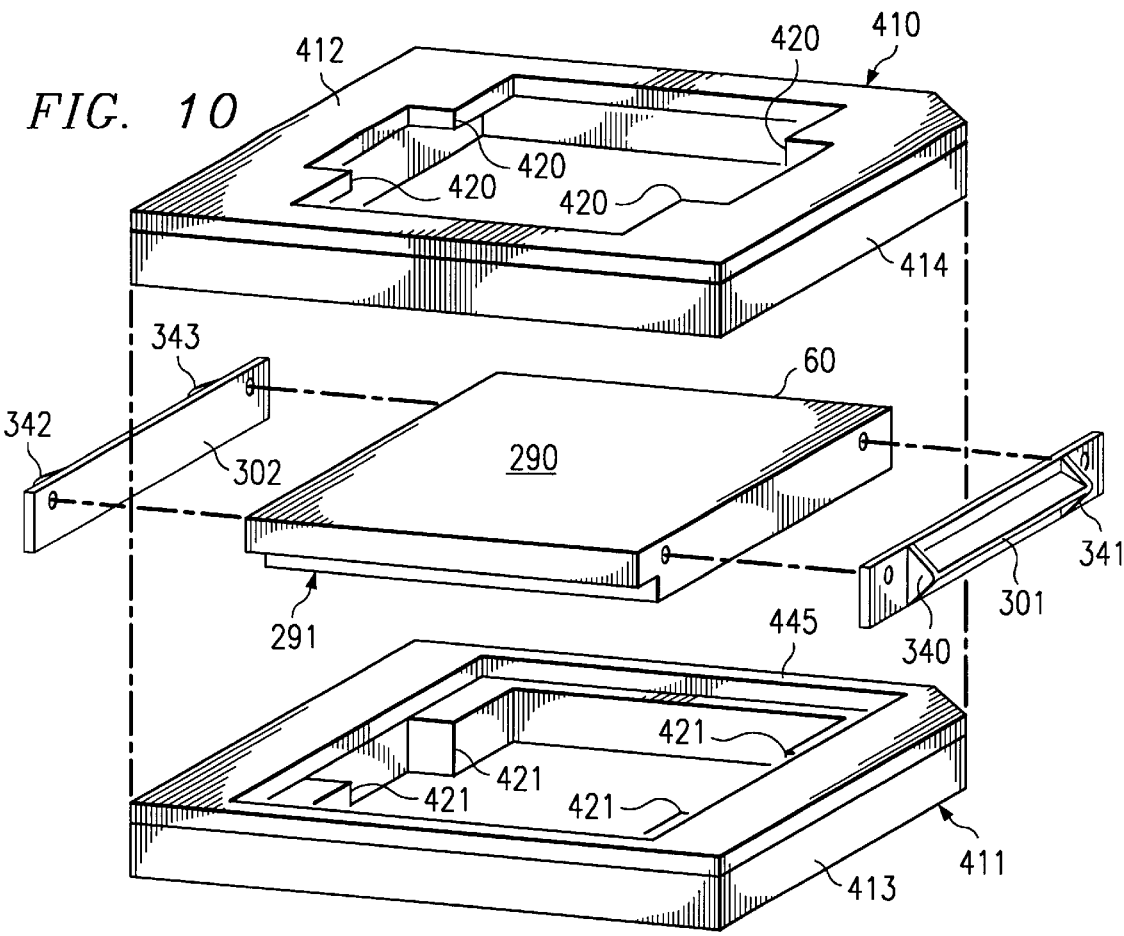
FIG. 10 is an exploded diagrammatic view of a device, two outriggers, and force absorption members comprising bonded inner and outer elements.
Figure 11:
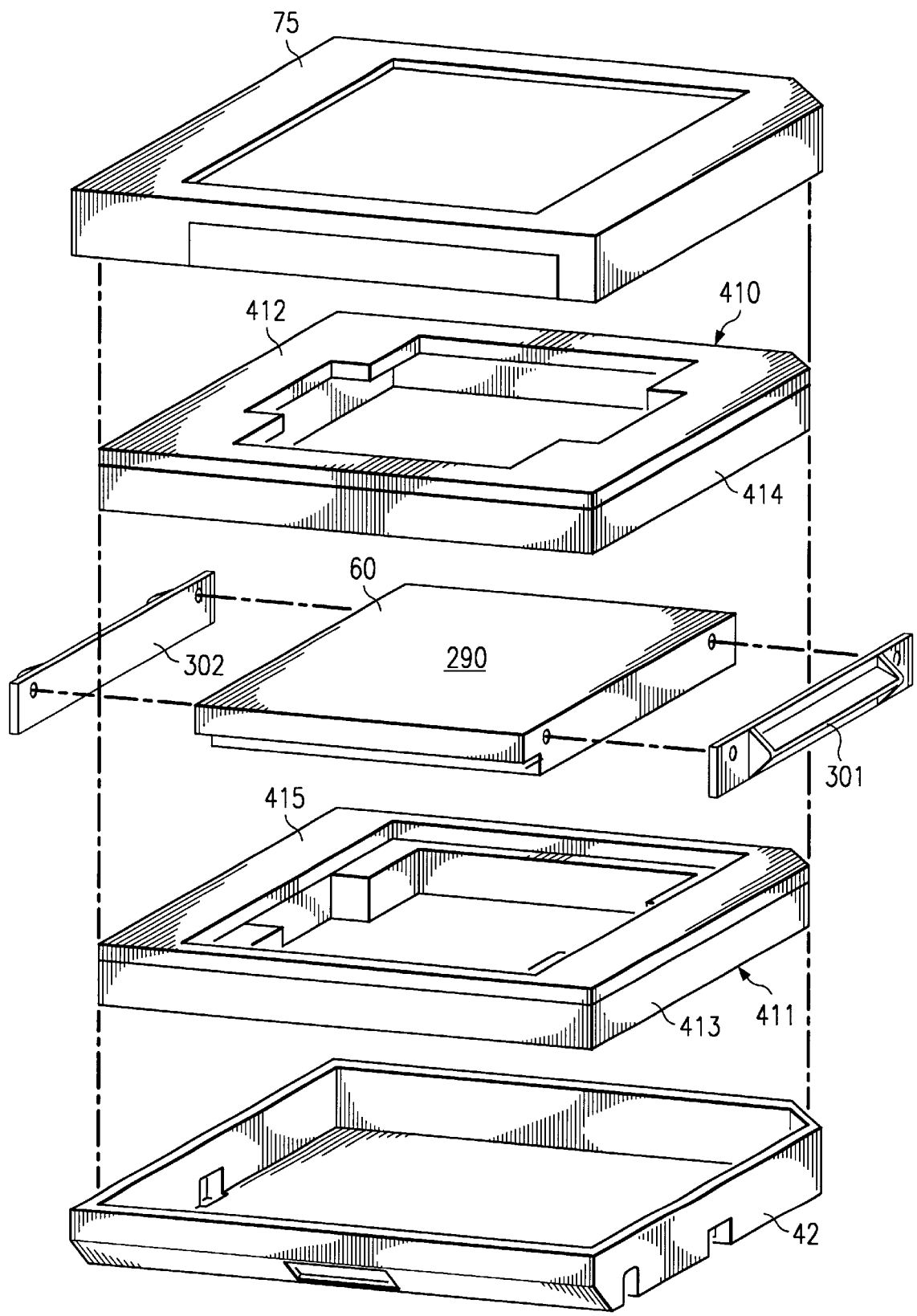
FIG. 11 is an exploded diagrammatic view of the device and structure of FIG. 10, together with the top and bottom halves of the cartridge shell.
Figure 12:
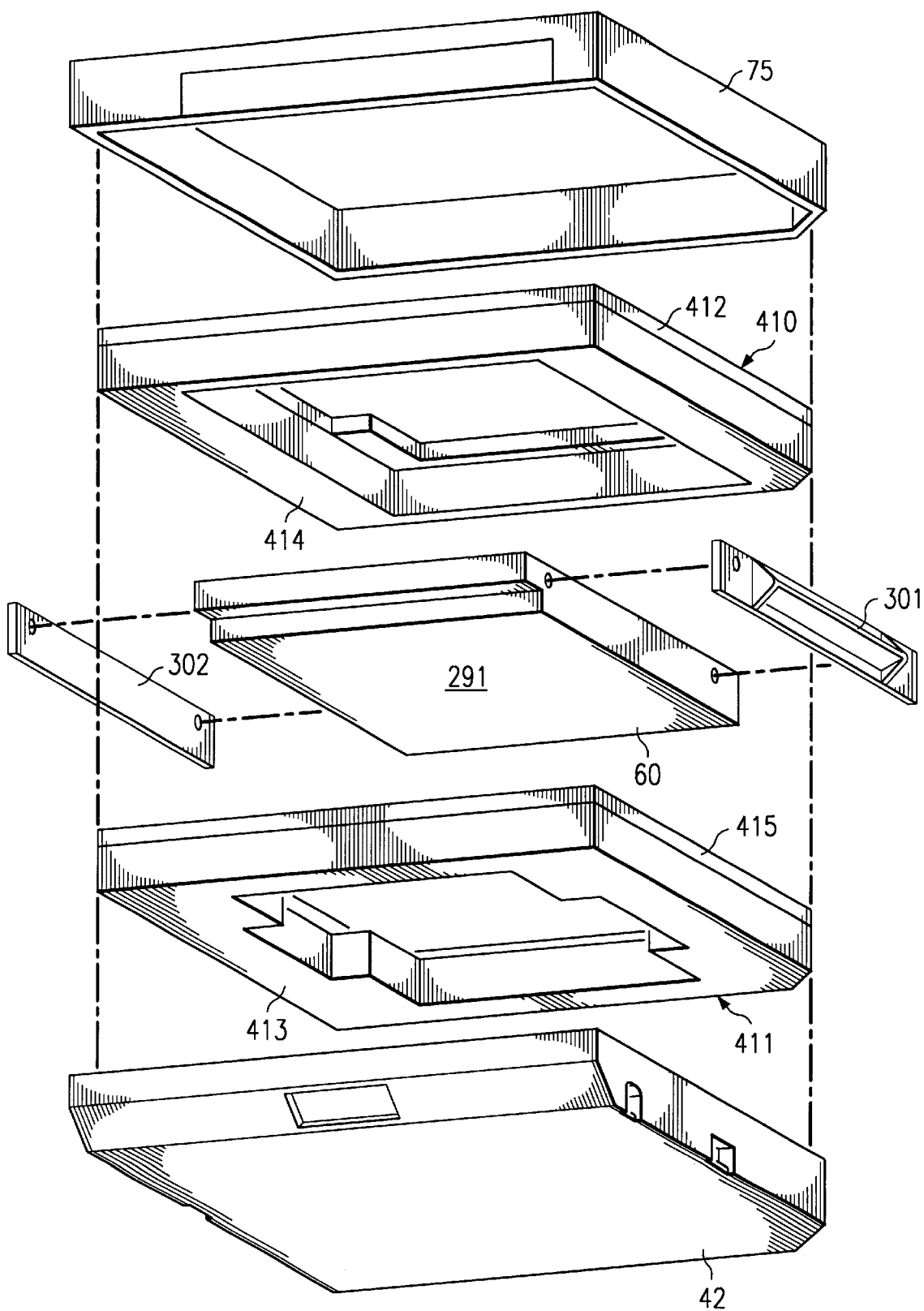
FIG. 12 is an exploded diagrammatic view of the structures of FIG. 11, as viewed from the bottom.

FIGS. 10–12 illustrate top and bottom force absorption members 410 and 411, each comprising bonded inner and outer elements. The outer elements 412 and 413 are of a lesser density than the inner elements 414 and 415, and the inner elements are in contact with the outriggers 301 and 302 to directly support the device 60 against shock. The outer and inner elements are bonded by suitable means as are known to those of skill in the art, such as by employing a contact cement, or by ultra-sonics.

In the illustrated example, both outer elements 412 and 413 optionally comprise support areas 420 and 421, while the inner elements 414 and 415 have no support areas, and fit tightly to the sides of device 60 without contacting the sensitive surface 290 or sensitive surface 291. Thus, the outriggers 301 and 302 fully transmit shock forces to inner elements 414 and 415 of the force absorption members, and the sensitive surfaces 290 and 291 are spaced from the support areas, and the support areas only support the less sensitive areas of the sensitive surfaces if the shock force is sufficient to considerably compress inner force absorption member elements 414 or 415. Thus, the support areas 420 and 421 serve as safety supports to prevent the sensitive surfaces 290 or 291 of the device 60 from impacting the top half 75, or the bottom half 42, of the cartridge shell, and to provide additional centering support. Since the inner and outer elements are bonded together, alignment holes may not be required.

As discussed above, the first and second outriggers 301, 302 each additionally comprises orthogonal projections 340, 341 and 342, 343, shown as triangular ears, at each end of the outriggers. The orthogonal projections 340–343 distribute a shock force to the force absorption members 410 and 411 in the lateral directions. Specifically, as the cartridge 40 is assembled, the triangular ears 340–343 are forced into the inner elements 414 and 415 of the force absorption members, so as to become embedded in the force absorption members and distribute any shock force in the lateral directions, and to support the device 60 against slippage with respect to the force absorption members in the lateral directions.

Referring to FIGS. 2 and 6, the device 60 may be provided with a breathing hole 420 to prevent variations in atmospheric pressure from deflecting the cover. The opening in force absorption member 310, in addition to avoiding the application of force to sensitive surface 290, provides an open area to prevent blockage of the breathing hole 420.

In accordance with another aspect of the present invention, force absorption members 310, 311 together comprise a combined uncompressed height dimension greater than the height dimension (in the direction of arrows 315) of the interior of the assembled cartridge shell 41. Thus, when the cartridge 40 is assembled, the force absorption members 310, 311 are compressed in the height dimension, forming a seal with the interior of the cartridge shell and forming a debris and water barrier to the open area and to the breathing hole 420.

Referring additionally to FIGS. 10 and 11, if a breathing hole 420 of FIG. 2 is present in the device, any bonding material, such as cement, must be chosen to minimize outgassing. In accordance with a further aspect of the present invention, at least the force absorption members, and preferably the parts forming the entirety of each cartridge half, including the force absorption member, are baked, e.g., for two hours at 100 degrees centigrade, to remove contaminants before introducing the drive 60 into the assembly.

Referring to FIGS. 2–4, desiccant packets may be placed into the open areas behind leaf spring tabs 320–325 to provide additional moisture proofing. The desiccant packets must not be so large that the spring action of the leaf spring tabs is affected.

Figure 13:
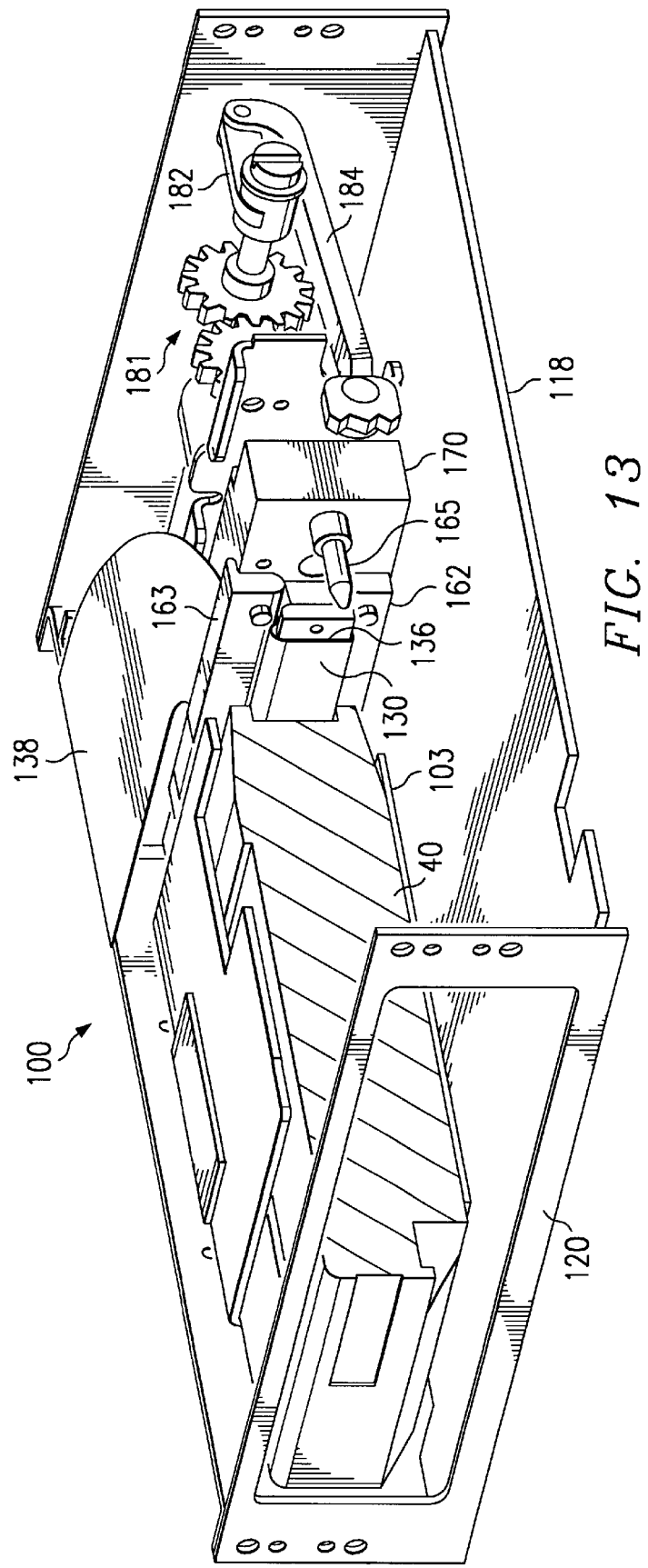
FIG. 13 is an isometric view of a transfer station for providing data transfer with respect to the portable cartridge of FIG. 1.

FIG. 13 illustrates an embodiment of a transfer station 100 and various components in accordance with copending U.S. patent application Ser. No. (TUC920010002). The transfer station may be employed on a stand-alone basis, or may comprise a transfer station of an automated data storage library.

The transfer station 100 is arranged to provide data transfer with respect to portable data storage cartridges 40 of FIG. 1. The transfer station 100 comprises a receiver 103 for receiving the portable data storage cartridge. The cartridge may be received manually, or may be received from a robot accessor of an automated data storage library, or may be received from an automated cartridge loader (ACL) as is known to those of skill in the art. A data transfer interface electrical connector 130 of the transfer station 100 is illustrated for mating with the external data transfer interface electrical connector 48 of the portable data storage cartridge 40, of FIG. 1. The transfer station 100 releasably, repeatably provides an electrical coupling with respect to the cartridge external data transfer interface. The electrical connector 130 may comprise an elastomeric compression element and a matching circuitized flexible substrate 136, which may be termination of a flex cable 138 connecting the electrical connector 130 to the PCB 118. Clamps 162 and 163 are bolted into place to hold the circuitized flexible substrate in place.

A loader of the transfer station 100 loads the portable cartridge 40, exerting a force normal to the facing surface of the connector 130. The loading mechanism is initially at an "insert" position with motor 180 having operated through gear train 181 to rotate bell crank 182 toward the front of the transfer station 100. Bell crank 182 has thus pushed beam 184, and therefore the receiver 103, towards the front opening 120 of 910 the transfer station. A portable cartridge may be inserted into the receiver when it is in the "insert" position. When inserted, motor 180 operates through gear train 181 to rotate bell crank 182 away from the front, and toward the rear, of the transfer station 100. Bell crank 182 thus pulls beam 184, and therefore the receiver 103, towards the rear of the transfer station. As the receiver 103 is pulled toward the rear of the transfer station, the loader engages the portable cartridge 40 of FIG. 1 at notches 58 and 59, and exerts a force on the portable cartridge 40 normal to the connector 130 to pull the cartridge. First, alignment pins (only alignment pin 165 is shown) engage corresponding holes 55 and 56 of the cartridge to orient the portable cartridge, registering the cartridge substrate electrical contacts 51 in face-to-face relation with matching circuitized flexible substrate electrical contacts of the loader. Then, the loader exerts the normal force on the portable cartridge to cause the portable cartridge substrate 50 (and backing plate 70) to compress the elastomeric compression element of the loader to create non-wiping contact between the electrical contacts 51 of the portable cartridge substrate 50 and the electrical contacts of the connector 130, thereby forming a releasable, repeatable electrical connection therebetween.

Figure 14:
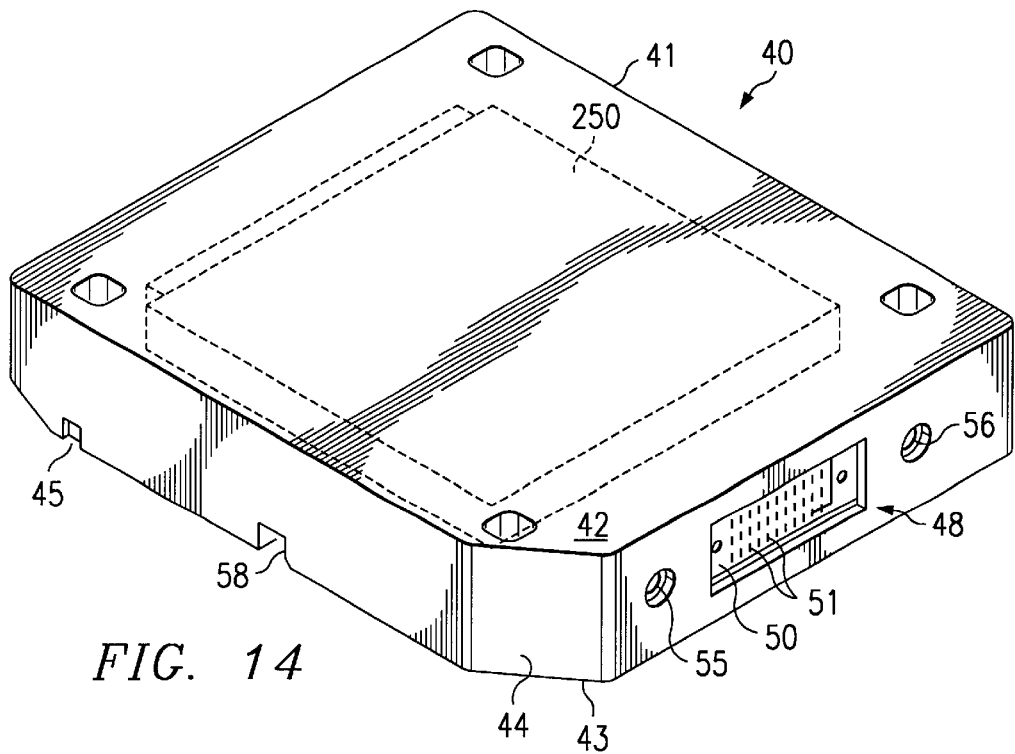
FIG. 14 is a diagrammatic illustration of a portable cartridge of FIG. 1 containing an optical disk drive assembly.

FIG. 14 illustrates a portable cartridge containing an alternative data handling or data storage device. Specifically, FIG. 14 illustrates a portable cartridge of FIG. 1 containing an optical disk drive assembly 250. Currently, commercially available optical disk drives would have to be modified to employ a non-removable optical disk. Other data handling devices may occur to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A shock mount structure for facilitating shock absorption with respect to a device having at least one attachment point, comprising:

at least one wing-like outrigger mounted to said device at said attachment point, said outrigger positioned between contacting force absorption members, distributing shock force of at least one direction to said force absorption members, and supporting said device against slippage with respect to said force absorption members in said at least one direction.

2. The shock mount structure of claim 1, wherein said outriggers comprise a first wing-like outrigger and a second wing-like outrigger mounted to said device and located at a diametrically opposite side of said device from said first outrigger, said second outrigger distributing said shock force of said at least one direction to a force absorption member, and supporting said device against slippage with respect to said force absorption member in said at least one direction.

3. The shock mount structure of claim 2, wherein said wing-like outriggers each comprises two surfaces on opposite sides thereof, each said surface having an average surface plane direction normal to said at least one direction, for distributing said shock force of said at least one direction and a shock force of a reverse of said at least one direction, and supporting said device against slippage with respect to said contacting force absorption members in said at least one direction and said reverse direction.

4. The shock mount structure of claim 3, wherein said two surfaces are substantially flat in said normal direction.

5. The shock mount structure of claim 3, wherein said first and said second wing-like outriggers each additionally comprises at least one orthogonal projection generally orthogonal to each respective said outrigger surface, said orthogonal projections distributing a shock force orthogonal to said at least one direction to a force absorption member, and supporting said device against slippage with respect to said force absorption member in said orthogonal direction, said orthogonal directions of said first and said second outriggers comprising the reverse of one another, respectively parallel to said outrigger surfaces.

6. The shock mount structure of claim 5, wherein said orthogonal projections comprise generally triangular ears at each end of said outriggers, and wherein said distributed orthogonal shock force is generally lengthwise of said outriggers.

7. A shock mount, packaging a device within a cartridge shell for providing shock protection of said device, said device having at least one attachment point, comprising:
   at least one wing-like outrigger mounted to said device at said attachment point and extending in a peripheral direction of said device and in an outward direction from said device,; and
   a plurality of force absorption members positioned between said at least one outrigger and said cartridge shell, two of said force absorption members in facing contact with each other and in contact with said at least one outrigger positioned between said contacting force absorption members, whereby said at least one outrigger distributes shock force of a direction normal to said peripheral and outward directions, to said force absorption members and said cartridge shell.

8. The shock mount of claim 7, wherein at least one of said force absorption members comprises an inner element and an outer element, each of foam materials, said inner element of greater density than said outer element, said inner element in contact with said at least one outrigger.

9. The shock mount of claim 7, wherein said at least one wing-like outrigger comprises two surfaces on opposite sides thereof, each said surface having an average surface plane in said peripheral and outward directions; and wherein said force absorption members are in contact with each of said two surfaces of said at least one outrigger, for distributing said shock force of said normal direction and a shock force of a reverse of said normal direction, and supporting said device against slippage with respect to said force absorption members in said normal direction and said reverse direction.

10. The shock mount of claim 7, additionally comprising leaf spring tabs formed on said cartridge shell, spaced from an edge of said cartridge shell to allow flexure of said leaf spring tabs, said leaf spring tabs positioned to contact at least one of said force absorption members in said outward direction from said at least one outrigger, spaced from said at least one outrigger, to absorb shock force of said device in said outward direction.

11. The shock mount of claim 7, wherein said device comprises a surface, at least a portion of which is sensitive to application of force; and wherein said shock mount said at least one outrigger peripheral and outward directions are generally parallel to said sensitive surface portion, and at least one of said force absorption members is open and does not contact said device at said sensitive surface portion.

12. The shock mount of claim 11, wherein said sensitive surface of said device additionally comprises portions that are not sensitive to application of force; and wherein at least one of said force absorption members additionally comprises support areas in direct contact with said portions of said surface that are not sensitive to application of force.

13. The shock mount of claim 11, wherein said force absorption members together comprise an uncompressed height dimension greater than an interior height dimension of said cartridge shell, such that said force absorption members are compressed in said height dimension, forming a seal with said interior of said cartridge shell.

14. The shock mount of claim 11, wherein said force absorption members are baked for removing contaminants.

15. The shock mount of claim 11, wherein said cartridge shell additionally supports an input/output interface; and wherein said shock mount additionally comprises a flex cable coupling said device and said input/output interface, and additionally isolating shock force between said device and said cartridge shell, said flex cable routed through said at least one force absorption member where said member is open.

16. A portable magnetic disk drive cartridge, comprising:
   a cartridge shell;
   an encased, self-contained, magnetic disk drive assembly, said magnetic disk drive assembly having a surface, at least a portion of which is sensitive to application of force, and having at least one attachment point;
   a plurality of wing-like force absorption members supported within said cartridge shell, and two of said force absorbing members in facing contact with each other; and
   at least one outrigger mounted to said device at said attachment point, said outrigger positioned between said contacting force absorption members, distributing shock force of a direction generally normal to said sensitive surface portion of said magnetic disk drive assembly, to said force absorption members, and supporting said magnetic disk drive assembly against slippage with respect to said force absorption members in said normal direction.

17. The portable magnetic disk drive cartridge of claim 16, wherein said outriggers comprise a first wing-like outrigger and a second wing-like outrigger mounted to said magnetic disk drive assembly and located at a diametrically opposite side of said magnetic disk drive assembly from said first outrigger, said second outrigger distributing said shock force of said normal direction to said force absorption members, and supporting said magnetic disk drive assembly against slippage with respect to said force absorption members in said normal direction.

18. The portable magnetic disk drive cartridge of claim 16, additionally comprising leaf spring tabs formed on said cartridge shell, spaced from an edge of said cartridge shell to allow flexure of said leaf spring tabs, said leaf spring tabs positioned to contact at least one of said force absorption members in an outward direction from said at least one outrigger, said outward direction generally parallel to said sensitive surface portion of said magnetic disk drive assembly, said leaf spring tabs spaced from said at least one outrigger, to absorb shock force of said device in said outward direction.

19. The portable magnetic disk drive cartridge of claim 16, wherein said at least one wing-like outrigger comprises two surfaces on opposite sides thereof, each said surface having an average surface plane generally parallel to said sensitive surface portion of said magnetic disk drive assembly; and wherein said force absorption members are in contact with each of said two surfaces of said at least one outrigger, for distributing said shock force of said normal direction and a shock force of a reverse of said normal direction, and supporting said magnetic disk drive assembly against slippage with respect to said force absorption members in said normal direction and said reverse direction.

20. The portable magnetic disk drive cartridge of claim 17, wherein said magnetic disk drive comprises a breathing hole at said sensitive surface portion; wherein at least one of said force absorption members is open and does not contact said sensitive surface portion, preventing blockage of said breathing hole.

21. The portable magnetic disk drive cartridge of claim 19, wherein at least one of said force absorption members comprises an inner element and an outer element, each of foam materials, said inner element of greater density than said outer element, said inner element in contact with said surfaces of said at least one outrigger.

22. The portable magnetic disk drive cartridge of claim 20, wherein said sensitive surface of said magnetic disk drive assembly additionally comprises portions that are not sensitive to application of force; and wherein at least one of said force absorption members additionally comprises support areas in direct contact with said portions of said surface that are not sensitive to application of force.

23. The portable magnetic disk drive cartridge of claim 20, wherein said force absorption members together comprise an uncompressed height dimension greater than an interior height dimension of said cartridge shell, such that said force absorption members are compressed in said height dimension, forming a seal with said interior of said cartridge shell, such that said force absorption members form a filter with respect to said breathing hole.

24. The portable magnetic disk drive cartridge of claim 20, wherein said force absorption members are baked for removing contaminants.

25. A shock mount for facilitating shock absorption with respect to a device, comprising:
 a cartridge shell having leaf spring tabs formed therein, spaced from an edge of said cartridge shell to allow flexure of said leaf spring tabs; and
 at least one force absorption member positioned between said device and said leaf spring tabs, and in contact with said leaf spring tabs, whereby said leaf spring tabs assist in absorbing shock force of a direction normal to said leaf spring tabs.

26. The shock mount of claim 25, wherein said device additionally has at least one attachment point, said shock mount additionally comprising:
 first and second outriggers mounted to said device at said at least one attachment point, said second outrigger located at a diametrically opposite side of said device from said first outrigger, said first and second outriggers spaced from said leaf spring tabs distributing a shock force of at least one direction to said force absorption member parallel to said leaf spring tabs, and supporting said device against slippage with respect to said force absorption member in said at least one direction.

* * * * *